Sept. 24, 1963 S. A. HAYES 3,104,823
MIXING APPARATUS
Filed Nov. 21, 1961 3 Sheets-Sheet 1

INVENTOR.
STANLEY A. HAYES
BY
Christie, Parker & Hale
ATTORNEYS.

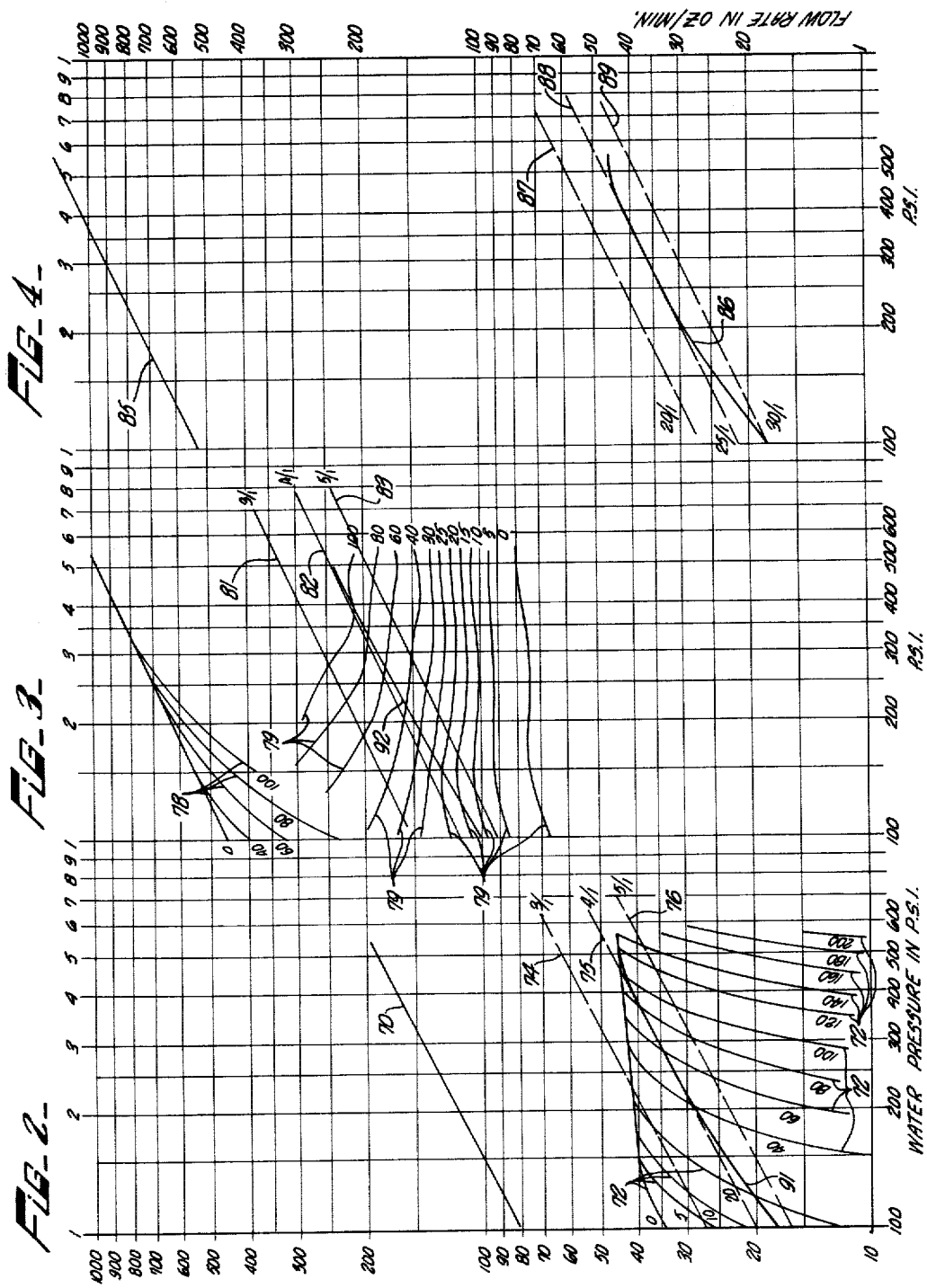

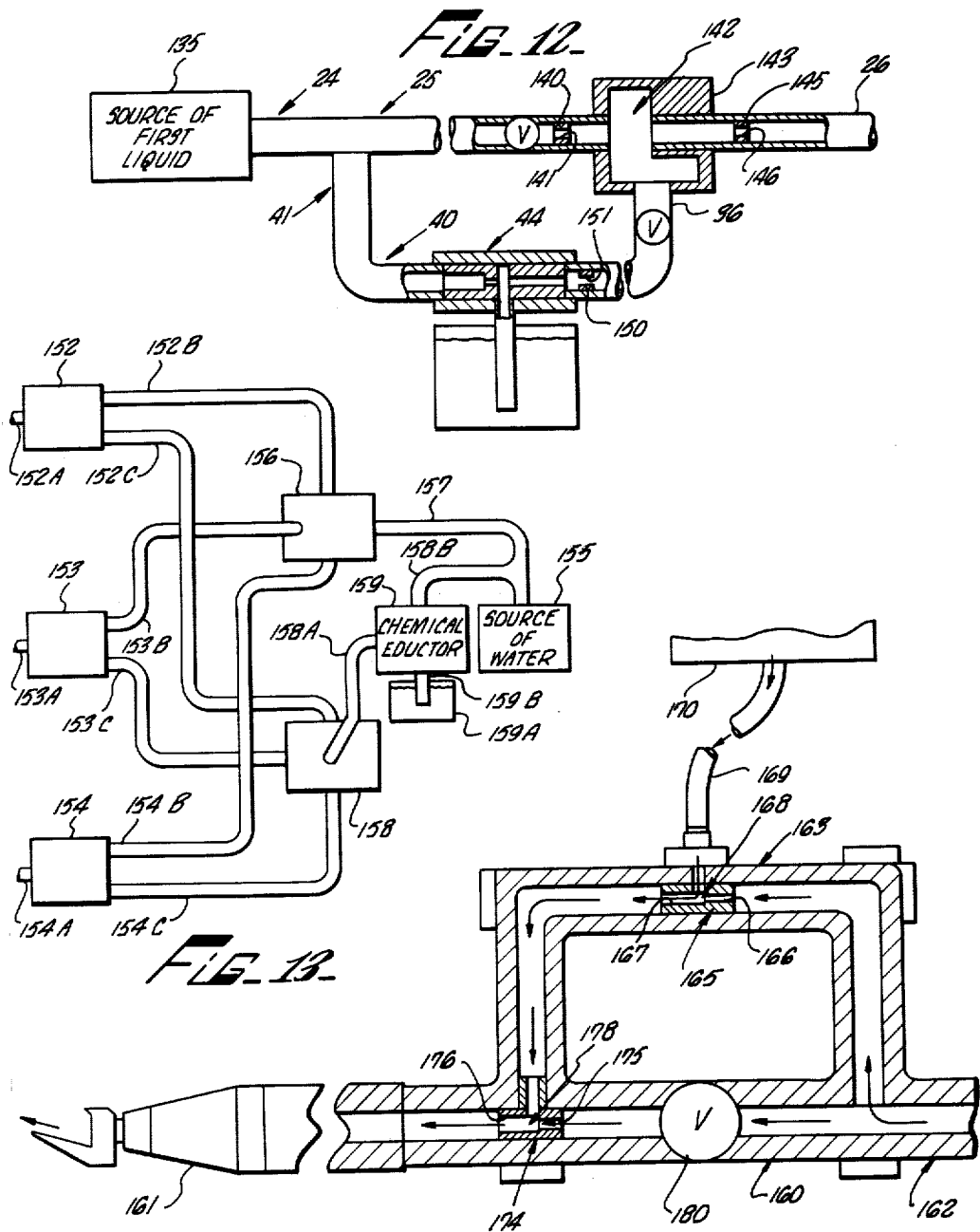

United States Patent Office 3,104,823
Patented Sept. 24, 1963

3,104,823
MIXING APPARATUS
Stanley A. Hayes, Arcadia, Calif., assignor to Hayes Spray Gun Company, Pasadena, Calif., a corporation of California
Filed Nov. 21, 1961, Ser. No. 153,797
14 Claims. (Cl. 239—304)

The present invention relates generally to mixing apparatus and more particularly to apparatus for mixing a second liquid with a first liquid to provide a discharge stream having a desired ratio of first and second liquids.

This application is a continuation-in-part application of my copending application Serial No. 746,312, filed June 30, 1958, now abandoned, which is a continuation-in-part application of my preceding application Serial No. 497,106, filed March 28, 1955, now forfeited.

Various types of apparatus for mixing a first liquid with a second liquid have been widely used for applying liquid chemicals such as fertilizers, insecticides, toxicants and fungicides to plants, trees, shrubs, lawns and agricultural crops. For example, garden hose sprayers of the type disclosed in my earlier Patents Nos. 2,381,589; 2,571,871; and 2,592,896 and Patent No. 2,388,445 (issued to James W. R. Stewart) function to educt a chemical solution into a stream of water under pressure from a garden hose connected to a city water system. These sprayers maintain the ratio of educted chemical to water constant over a wide range of water pressure (for example, 20 to 100 pounds). This action of maintaining a constant ratio of educted chemical to water over varying water pressures is defined as proportioning. Proportioning is extremely important when applying chemicals such as insecticides to plants where the water pressure is subject to change, such as with our city water systems, since chemicals for garden and industrial use must be applied at a specific solution strength or a particular ratio of chemical to water to obtain the desired control of the insects or plant diseases and prevent damage to the treated plants. Such prior art garden sprayers while very effective for the average home gardener where small volumes of chemical are to be sprayed over small areas are not suitable for use by commercial growers or nurserymen where large areas must be quickly sprayed requiring high water pressures. A pump may be used to increase the inlet water pressure for such sprayers and thereby the discharge volume and area covered in a given time. However, it is not practical for the operator to carry more than a small quantity of chemical (i.e. one quart) on the sprayer head because of the weight involved. The use of a proportioning eductor adjacent the pump with a length of hose such as fifty feet extending from the eductor to a spraying nozzle is not practical for power sprayers because such eductors will operate only over a very limited range of back pressures. The placement of an eductor adjacent the nozzle and a chemical container adjacent the pump with an additional hose connected between the chemical container and the eductor is also not practical where wettable powders and other materials that do not completely dissolve are to be sprayed. Such materials will settle out in the hose carrying the slow moving chemical solution and impair the operation of the sprayer.

Power sprayers capable of proportioning also have a great potential in applying germicides, bactericides and cleaning compounds etc. to equipment, interiors and exteriors of buildings for cleaning purposes.

As a result of the above problems involved in using eductors in power sprayers, large tank sprayers have been primarily used in the past for spraying large areas. In such tank sprayers, a premixed solution of chemical and water is placed in a large tank (for example 300 gallon capacity) and the premixed solution is pumped to a high pressure (for example, three or four hundred pounds per square inch) by a suitable pump for discharge through a nozzle to the plants to be treated. Such tank sprayers require that the pump handle chemical solution which may be very corrosive. Furthermore, such tank sprayers are large and generally carried on trucks which requires the use of roads for moving the sprayers from one place to another.

The disadvantages of the prior art sprayers for applying chemicals to large areas in a minimum of time are overcome by the present invention which provides a small unit capable of spraying a large volume of chemical solution at high pressure while maintaining the ratio of water to chemical constant with varying water pressures.

In accordance with the present invention, a liquid mixing apparatus for mixing a second liquid (i.e. chemical) with a first liquid (i.e. water) from a source of the first liquid under pressure includes a main liquid conduit including an inlet adapted to be connected to the source of the first liquid, a mixing chamber and an outlet for discharging the combined first and second liquid streams. An eductor having an inlet passage, an aspiration chamber and a cylindrical diffusion passage arranged in series relationship in that order is provided for educting the second liquid into a stream of the first liquid. Conduit means are provided for connecting the inlet passage of the eductor to the inlet of the main conduit. Conduit means are also provided for connecting the aspiration chamber to a source of the second liquid which may be at atmospheric pressure. Additional conduit means are provided for connecting the diffusion passage of the eductor to the mixing chamber in the main conduit. Restricting means are disposed between the mixing chamber and the inlet of the main conduit for providing a pressure drop in the first liquid flowing in the main conduit to cause a portion of the liquid to be by-passed through the eductor. The inlet passage of the eductor is constructed to provide a high velocity discharge stream having a velocity substantially in the direction of flow of the first liquid to produce a solid discharge stream into the aspiration chamber. The aspiration chamber is constructed to permit the boundaries of the discharge stream to directly contact the second liquid for entraining the second liquid into the first liquid. The diffusion passage of the eductor is provided with a larger cross sectional area than the inlet passage and a length at least equal to its diameter for confining the discharge stream from the inlet passage to allow the transfer of energy from the high velocity discharge stream to the second liquid. Restricting means are disposed between the mixing chamber in the main conduit and the outlet thereof for providing pressure drop between the mixing chamber and the outlet in accordance with the velocity of the liquid in the main conduit to provide back pressure to liquid flowing through the diffusion passage of the eductor in accordance with the velocity of liquid flowing through the main conduit.

The invention is described in more detail in reference to the accompanying drawings in which:

FIG. 2 is a graph on a log. log. scale illustrating the operation of the chemical eductor in the apparatus of FIG. 1 under certain conditions;

FIG. 3 is a graph on a log. log. scale illustrating the operation of the power eductor in the apparatus of FIG. 1 under certain conditions;

FIG. 4 is a graph on a log. log. scale illustrating the combined operation of the chemical and power eductors in the apparatus of FIG. 1;

FIG. 12 is an elevation view partially in section of another embodiment of the present invention;

FIG. 13 is a block diagram of an eductor apparatus employing three power eductors in accordance with the present invention;

FIG. 14 is an elevation view partially in section of another embodiment of the present invention.

Figure 1:
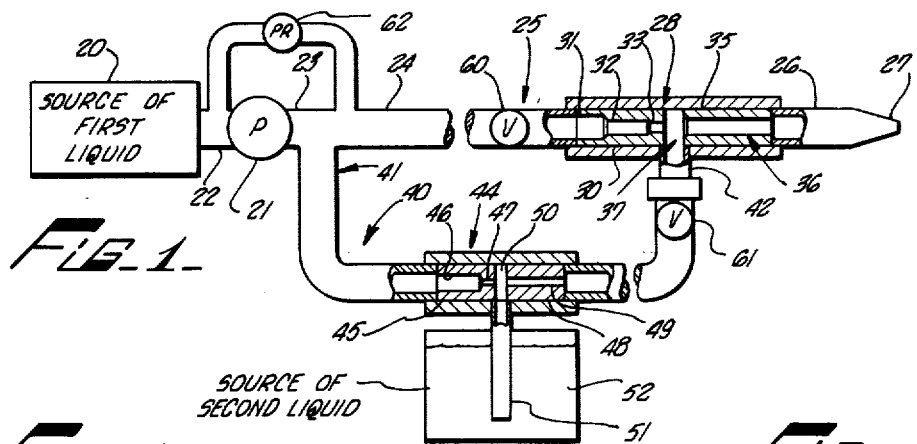
FIG. 1 is an elevation view of one embodiment of the present invention partially in section.

Referring now to the drawings and more particularly to FIG. 1, there is illustrated a source of a first or carrier liquid such as water indicated generally at 20. A pump 21 has an inlet 22 connected to the source of water and an outlet 23. The pump may be of any suitable type for pumping liquid from a low pressure to a relatively high pressure such as 500 or more pounds per square inch (p.s.i.). A prime mover (not shown) may be used for driving the pump 21 in a well known manner. The outlet of the pump 23 is connected to an inlet 24 of a main conduit indicated generally at 25. The main conduit has an outlet 26 connected to a suitable spraying nozzle 27 through which the water and chemical solution is discharged.

A power eductor 28 of the jet pump type is disposed in the main conduit. The power eductor 28 includes a first bushing 30 which defines stepped cylindrical bores 31, 32 and 33 therethrough of decreasing diameter from inlet to outlet as illustrated. The power eductor 28 also includes a second bushing 35 which defines a cylindrical bore 36 therethrough which functions to confine (or seal) the discharge stream from the bushing 30. The bushings 30 and 36 are spaced apart to provide a mixing chamber 37 which permits entrainment of the chemical solution into the water stream as will be more fully described.

A bypass conduit indicated generally at 40 has an inlet 41 connected to the inlet 24 of the main conduit and an outlet 42 connected to the mixing chamber 37 of the power eductor 28. A chemical jet pump eductor indicated generally at 44 is disposed in the bypass conduit and includes a first bushing 45 which defines cylindrical bores 46 and 47 therethrough of decreasing diameter from inlet to outlet as shown. The chemical eductor 44 also includes a second bushing 48 which defines a cylindrical bore 49 therethrough. The bushings 45 and 48 are spaced apart to provide an aspiration or mixing chamber 50. A suitable conduit 51 is connected between the aspiration chamber 50 of the chemical eductor and a source or container 52 of a second liquid such as a chemical solution.

The smallest cylindrical bore 47 of the bushing 45 forms the inlet passage of the chemical eductor. This cylindrical inlet passage 47 provides a high velocity discharge stream having a velocity substantially in the direction of flow to provide a solid integral discharge stream. It is essential that the velocity of the discharge stream from the inlet passage 47 does not include any substantial components at an angle from the longitudinal axis of the inlet passage. While the inlet passage is illustrated as having a cylindrical configuration, this passage may have a square or other non cylindrical configuration. The aspiration chamber 50 of the chemical eductor surrounds the discharge stream from the inlet passage 47 to permit the boundary of this stream to directly contact and entrain the chemical solution educted from the container 52. The cylindrical bore 49 in the second bushing 48 is concentrically aligned with the inlet passage 47 and functions as a diffusion passage for confining the discharge stream from the inlet passage 47 to allow the transfer of energy from the high velocity discharge stream of water to the chemical solution in the container 52. The diffusion passage 49 has a larger cross sectional area than the inlet passage 47 and a length at least equal to its diameter and preferably several times its diameter.

A main conduit valve 60 is disposed in the main conduit between the inlet thereof and the power eductor 28 for controlling the flow of liquid through the main conduit. A chemical valve 61 is disposed in the bypass conduit between the chemical eductor 44 and the outlet 42 of the bypass conduit for controlling the flow of chemical solution into the stream flowing through the main conduit as will be more fully explained. A variable and controllable pressure relief valve 62 is connected between the inlet and the outlet of pump 21 for preventing the discharge pressure of the pump 21 from exceeding a predetermined value. This valve 62 may be controlled to provide any predetermined water pressure in the inlets 24 and 41 of the main and bypass conduits within its operating range. For example, the valve 62 may be arranged to provide any desired water pressure between 100 and 500 or more p.s.i. without changing the speed of the pump 21.

In operation water is discharged from the pump 21 at a high pressure, for example 500 p.s.i., and flows through the main conduit and the power eductor 28. Water also flows through the bypass conduit 40 due to the restriction imposed by the cylindrical bore 33 in the first bushing 30 of the power eductor. The water flowing through the bypass conduit passes through the chemical eductor 44 creating a partial vacuum in the aspiration chamber 50 which lifts chemical solution from the container 52 into the aspiration chamber 50 where it is entrained in the water stream. The combined water and chemical leaving the aspiration chamber 50 of the chemical eductor 44 are confined or sealed in the diffusion passage 49 and then discharged into the bypass conduit which is connected to the mixing chamber 37 of the power eductor. The water and chemical solution passing through the bypass conduit is forced into the mixing chamber 37 where it is entrained with the water stream discharged from the passage 33. The passage 36 in the second bushing 35 of the power eductor 28 functions as a diffusion passage for confining the combined water and chemical solutions and allows the transfer of energy from the high velocity discharge stream from the inlet passage 33 to the stream passing through the bypass conduit 40. As a result the stream leaving the diffusion passage 36 of the power eductor 28 is a completely mixed high velocity stream which is then discharged from the nozzle 27 to the plants, trees, etc. to be treated.

The unique operation of the apparatus of FIG. 1 is best understood by reference to the graphs of FIGS. 2, 3 and 4. In FIGS. 2, 3 and 4 (which are plotted on log. log. scale) the abscissa represents the water pressure on the inlet of the main and bypass conduits in pounds per square inch and the ordinate represents the mass flow rate of the water or chemical solution in ounces per minute.

In FIG. 2 the operation of the chemical eductor 44 is illustrated in which the curve 70 represents the flow rate of the water through the bypass conduit 40. The curves 72 represent the flow rate of chemical solution into the eductor 44 with different back pressures on the diffusion passage 49 as marked on the graph. For example, with 40 p.s.i. back pressure on the diffusion passage, the educted chemical flow rate varies from 10 at 150 p.s.i. inlet pressure to approximately 45 ounces per minute at 550 p.s.i. inlet pressure. The dashed curves 74, 75 and 76 represent a constant ratio of 3, 4 and 5 to 1, respectively, of water to the educted chemical solution. From the curves 72 it is obvious that the ratio of water to chemical solution changes in the chemical eductor 44 with varying inlet water pressures for any given back pressure on the diffusion passage 49. Thus the ratio of water to chemical is constantly changing in the chemical eductor with constant back pressures and varying inlet water pressures.

In FIG. 3 the operation of the power eductor 28 is illustrated in which the curves 78 represent the flow rate of water passing through the inlet passage 33 with varying water pressures in the mixing chamber 37. As is shown by the curves 78, the water pressure in the mixing chamber 37 varies from zero to 100 p.s.i. The curves 79 in FIG. 3 represent the flow rate of the combined chemical and water streams from the bypass conduit 40 into the aspiration chamber 37 for various aspiration chamber pressures from 0 to 100 p.s.i. as illustrated. The dashed curves 81, 82 and 83 represent the ratios (3, 4 and 5 to 1, respectively, of the carrier water stream (passing through the inlet passage 33) in the power eductor 28 to the educted liquid (from the bypass conduit 40). As is illustrated by the curves of FIG. 3, the ratio of carrier stream to educted liquid varies over a wide range with varying inlet water pressures when the mixing chamber pressure is constant.

In FIG. 4 there is illustrated the combined operation of chemical eductor 44 and the power eductor 28 connected in series as shown in the apparatus of FIG. 1. In FIG. 4 the curve 85 represents the total flow of water through the chemical and power eductors and the curve 86 represents the flow of chemical from the container 52 into the combined series eductor arrangement. The dashed curves 87, 88 and 89 represent ratios of water to educted chemical of 20, 25 and 30 to 1, respectively. With the range of inlet water pressures from 200 to 500 p.s.i., the ratio of water to educted chemical in the apparatus of FIG. 1 varies from 24.8 to 25.6 with an average deviation of less than 1%. This accuracy is much greater than that obtainable from a single proportioning eductor.

An analysis of the curves 72 and 79 in FIGS. 2 and 3 illustrates that neither the chemical eductor nor the power eductor achieve proportioning with a given mixing chamber pressure. An examination of these curves does not lead to the conclusion that combining the chemical and power eductors in a series arrangement such as shown in FIG. 1 should provide any proportioning action. Such curves indicate that no proportioning action should logically result from the apparatus of FIG. 1. The unique operation of the chemical and power eductors in the apparatus of FIG. 1 is not completely understood. However, it is known that the chamber pressure in the power eductor and back pressure on the chemical eductor change in a unique manner as the inlet water pressure varies. The cooperation of the power and chemical eductors causes the chemical eductor to operate on the curve 91 in FIG. 2 and the power eductor to operate on curve 92 in FIG. 3. The result is a highly accurate proportioning power sprayer which employs two jet pump eductors in a series arrangement that solves the problems of the prior art sprayers.

For example, the chemical eductor 44 may be placed near the pump 21 so that the tank 52 of chemical solution and the pump may be placed on a suitable cart to permit the unit to be conveniently moved from one place to another. Since the ratio of water to chemical in the apparatus of FIG. 1 is 24 to 1 the tank 52 need only hold ten or fifteen gallons of chemical solution to permit the sprayer to spray 240 to 360 gallons of diluted spray. Suitable hoses may be connected between the power eductor, the pump and the chemical eductor to permit the operator to spray at a convenient distance from the pump, for example, 50 to 100 feet. This permits the unit to be efficiently used for spraying a relatively wide area without moving the pump and tank 52. Since the tank 52 and pump 21 are relatively small (for example, they may comprise a volume of less than 5 or 6 cubic feet) the entire unit may be readily moved from one place to another without the necessity of employing a truck. The use of a chemical eductor located adjacent the pump with a length of hose connecting it to the mixing chamber of the power eductor prevents non soluble materials from settling out in the bypass conduit or hose because the stream passing through the bypass hose is moving at a relatively high velocity. The most important advantage of the apparatus of FIG. 1, however, is the accuracy by which it maintains the ratio of educted chemical to water constant over a very wide range of water pressures. As pointed out previously, this accuracy is not possible with the use of a single eductor.

FIGURES 5 through 9 illustrate various types of chemical eductors that may be employed in the apparatus of FIG. 1. For example, in FIG. 5 a first bushing 100 is provided with bores 101 and 102 wherein the bore 102 has a very short length compared to its diameter. The bore 102 functions as an inlet passage to direct the stream into a cylindrical diffusion passage 103 formed in a second bushing 104. The bushings 100 and 104 are spaced apart to provide an aspiration chamber 105.

Figures 5, 6:
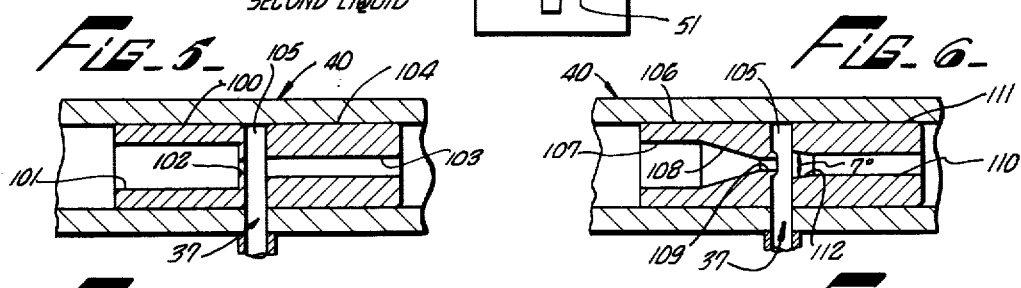
FIG. 5 is a sectional elevation of another embodiment of the chemical eductor for use in the apparatus of FIG. 1.
FIG. 6 is a sectional elevation of another embodiment of the chemical eductor for use in the apparatus of FIG. 1.

In FIG. 6, a first bushing 106 is provided with a first bore 107, a long taper 108 and an inlet passage 109 which directs the discharge stream into a cylindrical diffusion passage 110 formed in a second bushing 111. A slightly tapered passage 112, for example, approximately 7° (included angle) is formed in the inlet of the bushing 111 to serve as a receiving passage for collecting the combined educted chemical and water streams passing through the aspiration chamber 105. It is necessary to provide a substantially cylindrical diffusion passage in the chemical eductor to achieve the proportioning operation. However, this diffusion passage may be preceded by a taper or a passage of larger diameter as will be discussed more fully below.

Figures 7, 8:
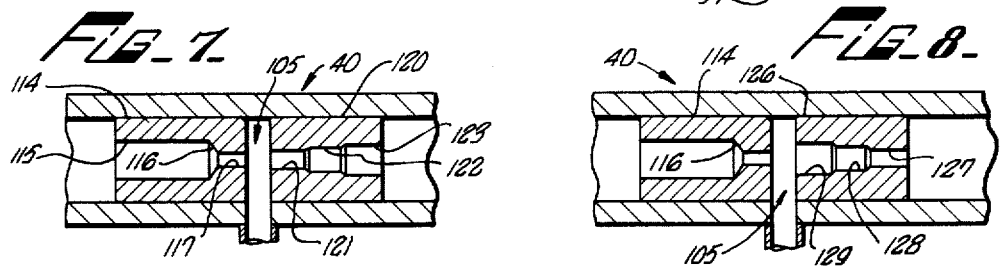
FIG. 7 is a sectional elevation of another embodiment of the chemical eductor for use in the apparatus of FIG. 1.
FIG. 8 is a sectional elevation of another embodiment of the chemical eductor for use in the apparatus of FIG. 1.

In FIG. 7 there is illustrated another type of chemical eductor in which a first bushing 114 is provided with a first bore 115, a short tapered passage 116 and an inlet passage 117. The second bushing 120 is provided with a cylindrical diffusion passage 121 and two outlet passages 122 and 123 of larger diameter than the diffusion passage 121.

FIG. 8 illustrates a chemical eductor with a second brushing 126 having a cylindrical diffusion passage 127 and a pair of receiving passages 128 and 129 of larger diameter than the diffusion passage and positioned upstream from it.

Figures 9, 10:
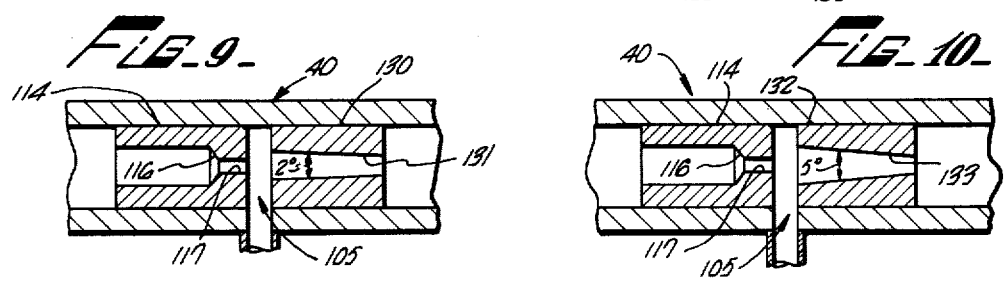
FIG. 9 is a sectional elevation of another embodiment of the chemical eductor for use in the apparatus of FIG. 1.
FIG. 10 is a sectional elevation of a chemical eductor that was found unsatisfactory for use in the apparatus of FIG. 1.

In FIG. 9 a chemical eductor is illustrated with a second bushing 130 having a diffusion passage 131 with a slight taper. The taper of the diffusion passage 131 is approximately a 2° included angle, and for purposes of this invention is considered substantially cylindrical. The chemical eductor of FIG. 9 with a slightly tapered diffusion passage 131 provided an average deviation in the ratio of educted chemical to water of 4.6% over a range of water pressures of 200 to 500 p.s.i. when employed in the apparatus of FIG. 1. While the results of the chemical eductor of FIG. 9 are not as good as the results obtained with the chemical eductors illustrated in FIGS. 1, 5, 6, 7 and 8, it is considered very satisfactory for use in a power sprayer where the ratio of water to educted chemical must remain substantially constant.

In FIG. 10, there is illustrated a chemical eductor with a second bushing 132 having a tapered diffusion passage 133 with a 5° included angle. The operation of this chemical eductor in the apparatus of FIG. 1 was found unsatisfactory. Thus the diffusion passage in the chemical eductor of the apparatus of FIG. 1 must be substantially cylindrical and must have a length at least equal to its diameter and preferably several times its diameter to achieve the required proportioning operation.

The apparatus of FIG. 1 has been illustrated as providing an overall ratio of water to educted chemical of 24 to 1. The chemical and power eductors 44 and 28, respectively, have also been illustrated as operating at a ratio of approximately 4 to 1 of carrier stream or water to secondary or educted liquid. It is preferable but not necessary that the chemical and power eductors operate at the same ratio of carrier stream to educted liquid. The ratio of operation of each of the eductors is rate of flow of driving water or carrier liquid divided by the educted liquid. The ratio of the combined eductors operating in series is the flow rate of the total driving water stream divided by the flow rate of the educted chemical solution from the container 52 in FIG. 1. A material balance of these streams of liquid results in the following equation that relates the ratio of the individual eductors during operation to the overall ratio for the combination.

$$R_0 = R_1 + R_1 \times R_2 + R_2$$

where:

$R_0$=the overall ratio for the combined chemical and power eductors
$R_1$=the ratio for the chemical eductor and,
$R_2$=ratio for the power eductor.

Figure 11:
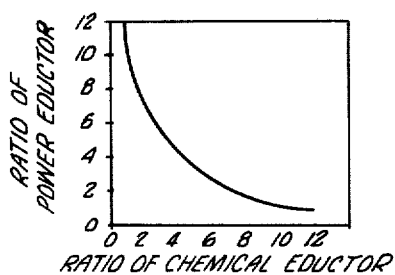
FIG. 11 is a graph illustrating the operation of the chemical and power eductors of the apparatus of FIG. 1 for a combined ratio of the first and second liquid of 24 to 1.

This material balance is illustrated in FIG. 11 in which the ordinate represents the ratio of the power eductor and the abscissa represents the ratio of the chemical eductor for a combined operation at a ratio $R_0$ of 24 to 1. Where the chemical eductor is operating at a ratio of 12 to 1, the power eductor must operate at a ratio of approximately 1-1 to provide an overall ratio of 24 to 1. In this situation the overall ratio will change appreciably for even small changes in the ratio of the power eductor. For this reason, it is highly desirable to design the chemical and power eductors to operate at approximately the same ratio.

It should be noted that the apparatus of FIG. 1 may be arranged to provide any desired ratio of carrier liquid to the educted liquid i.e. 10 to 1, 15 to 1, 20 to 1 etc.

The design of the power eductor 28 is not as critical as the design of the chemical eductor and the inlet passage 33 for the power eductor 28 may be of any suitable configuration, tapered, cylindrical, square etc., provided that it discharges the stream directly into the diffusion passage with substantially no velocity components at an angle from the direction of flow. The diffusion passage 36 of the power eductor need not be cylindrical but may have a substantial taper to it. This diffusion passage, however, must confine or seal the high velocity stream passing through the mixing chamber 37 to permit the exchange of kinetic energy between the high velocity water stream and the relatively low velocity educted stream passing from the bypass conduit into the mixing chamber 37.

The efficiency of the apparatus of FIG. 1 is very high and has been measured at greater than 96%. This high efficiency results from the action of the power eductor 28 which efficiently converts the potential energy from the high pressure water stream into kinetic energy which provides a long throw of the stream issuing from the nozzle 27. For example, the throw for a flow rate of 5 gallons per minute through the apparatus of FIG. 1 may be as high as 80 feet.

Where it is not desired to provide a high velocity discharge spray or a large throw, a pair of restrictions in the main conduit may be substituted for the power eductor as shown in FIG. 12. A restriction in the form of a bushing 140 having a bore 141 is disposed in the main conduit between a mixing chamber 142 and the inlet 24 which is connected to a source 135 of the first liquid under suitable pressure. This restriction serves the purpose of providing a pressure drop in the water stream flowing though the main conduit to cause a portion of the water stream to be bypassed through the bypass conduit 40 and the chemical eductor 44. A second restriction in the form of a bushing 145 having one or more holes 146 therethrough is disposed between the mixing chamber 142 and the outlet 26 of the main conduit. This second restriction provides a pressure drop between the mixing chamber and the outlet 26 that varies in accordance with the velocity of the liquid flowing in the main conduit to provide a back pressure to the combined chemical and water streams flowing in the bypass conduit 40 in accordnace with the velocity of the liquid flowing through the main conduit. In the apparatus of FIG. 12 a third restriction in the form of a bushing 150 having one or more bores 151 therethrough may also be disposed in the bypass conduit 40 between the chemical eductor 44 and the outlet 36 of the bypass conduit for providing an additional back pressure to the chemical eductor 44. The restriction 150 may be employed in the apparatus of FIG. 12 (and FIG. 1) to increase the proportioning accuracy of the unit. The apparatus of FIG. 12 will operate to provide a substantially constant ratio of water or carrier stream to educted chemical solution over a wide range of inlet water pressure. However, this apparatus is not efficient and will not provide a high velocity discharge stream through the outlet 26 as compared with the apparatus of FIG. 1.

In comparing the apparatus of FIGS. 1 and 12 it should be noted that the inlet and diffusion passages of the power eductor 28 of FIG. 1 function to provide a restriction to liquid flow in a manner similar to the restrictions 140 and 145 of FIG. 12. However, the inlet and diffusion passages of the power eductor 28 also function to educt the liquid flowing in the bypass conduit 40 into the water stream flowing through the main conduit 25.

FIG. 13 illustrates an eductor apparatus in accordance with the present invention in which three power eductors 152, 153, 154 are connected to a single source 155 of water or first liquid under suitable pressure. The power eductors 152, 153 and 154 may be identical to the power eductor 28 of FIG. 1. Each of the power eductors 152, 153, 154 has an outlet 152A, 153A and 154A, respectively, which may be connected to a suitable nozzle. Each of the power eductors has a water inlet 152B, 153B, 154B, respectively, for receiving water under pressure. The water inlets 152B, 153B, 154B of the power eductors are connected to the inlet passages of the eductors thereof (for example, passage 31 in the power eductor 28 of FIG. 1). The water inlets 152B, 153B and 154B are connected through a manifold 156 and a main conduit 157 to the source of water 155. The eductors 152—154 include chemical inlets 152C, 153C, 154C, respectively, coupled to the mixing chamber of the eductors (for example, chamber 37 in the power eductor 28 of FIG. 1). The chemical inlets 152C, 153C and 154C are coupled through a manifold 158 and a bypass conduit 158A to a chemical eductor 159 which may be identical to the chemical eductor 44 in the apparatus of FIG. 1. The chemical eductor 159 is connected to the source of water 155 by a bypass conduit 158B. The conduit 158B is connected to the inlet passage (i.e. passage 46 of the eductor 44 of FIG. 1) of the chemical eductor 159. The bypass conduit 158A is connected to the diffusion passage of the eductor (passage 49 of the eductor 44 of FIG. 1). A source of chemical or second liquid 159A is coupled to the aspiration chamber (chamber 50 of the eductor 44 of FIG. 1) of the chemical eductor by means of a conduit 159B. In operation, water flows through the chemical eductor 159, educts chemical from the source 159A, mixes the chemical with the water stream and discharges the mixed chemical solution through the bypass conduit 158A into the manifold 158 and then to the chemical inlets of the power eductors 152, 153, and 154. Water also flows through the manifold 156, the water inlets 152B, 153B, 154B of the power eductors and educts the chemical solution flowing through the chemical inlets of the power eductors 152, 153 and 154 and the resultant solution is discharged from the outlets 152A, 153A and 154A. The apparatus of FIG. 13 is very useful in supplying accurate concentrations of chemical solution to a plurality of spraying nozzles from one source of water under pressure and one chemical eductor.

FIG. 14 illustrates another embodiment of the present invention which is identical with an embodiment illustrated in my copending application Serial No. 746,312, filed June 30, 1958. The apparatus of FIG. 13 is similar to the apparatus of FIG. 1 in which a water stream flows from right to left through a main conduit 160 and out of a nozzle 161 connected to the left end of the main conduit. A bypass conduit 163 is connected at an upstream location to the inlet 162 of the main conduit. A chemical eductor 165 is disposed in the bypass conduit and has cylindrical bores 166 and 167 therethrough. The bore 166 forms the inlet passage of the eductor and the bore 167 which has a larger diameter than the inlet passage 166 is the diffusion passage of the chemical eductor. An aspiration chamber 168 is formed at the junction of the inlet and diffusion passages 166 and 167. A suitable conduit 169 is connected between the aspiration chamber 168 and a supply of chemical solution 170. A power eductor 174 is disposed in the main conduit and includes cylindrical bores 175 and 176. The bore 175 forms the inlet passage for the power eductor and the bore 176, which has a larger cross sectional area than the inlet passage 175, forms the diffusion passage. An aspiration chamber 178 is formed at the junction of the inlet and diffusion passages 175 and 176. The bypass conduit 163 is connected to the aspiration chamber 178 as shown. A control valve 180 may be used if desired in the main conduit between the inlet end thereof and the power eductor 174 to increase regulation of the amount of liquid bypassed from the main conduit 160 through the bypass conduit 163. In the operation of the apparatus of FIG. 11 water flows through the main conduit from right to left in a quantity determined by the inlet passage 175 and the position of the valve 180. Depending upon the position of the valve 180 a portion of the liquid flowing through the main conduit is bypassed through the chemical eductor 165 and into the aspiration chamber 178 of the power eductor 174, which educts the solution in the bypass conduit into the stream passing through the inlet passage 175 thereof and discharges the combined streams through the nozzle 16.

There has thus been described a highly efficient and accurate power sprayer for spraying chemical solution such as insecticides, fungicides, cleaning compounds, etc., which maintains the ratio of water to educted chemical constant over a wide range of water pressures.

What is claimed is:

1. In a liquid mixing apparatus for mixing a second liquid with a first liquid from a source of the first liquid under pressure the combination which comprises a main liquid conduit including an inlet adapted to be connected to the source of the first liquid, a mixing chamber and an outlet, an eductor having an inlet passage, an aspiration chamber and a substantially cylindrical diffusion passage arranged in series relationship, conduit means for connecting the inlet passage of the eductor to the inlet of the main conduit, conduit means for connecting the aspiration chamber to a source of the second liquid, conduit means for connecting the diffusion passage to the mixing chamber in the main conduit, the inlet passage of the eductor being constructed to provide a high velocity discharge stream having a velocity substantially in the direction of flow to provide a solid integral discharge stream, the aspiration chamber of the eductor being constructed to permit the boundary of the discharge stream to directly contact the second liquid to permit entrainment of the second liquid into the first liquid, the diffusion passage having a larger cross sectional area than the inlet passage and a length at least equal to its diameter for confining the discharge stream from the inlet passage to allow the transfer of energy from the high velocity discharge stream to the second liquid, a restriction disposed in the main conduit between the inlet and the mixing chamber thereof for providing a pressure drop in the first liquid flowing in the main conduit to cause a portion of the first liquid to be bypassed through the eductor, and a restriction in the main conduit disposed between the mixing chamber and the outlet thereof for providing a pressure drop between the mixing chamber and the outlet thereof in accordance with the velocity of liquid in the main conduit to provide a back pressure to liquid flowing through the diffusion passage of the eductor in accordance with the velocity of liquid flowing through the main conduit.

2. In a liquid mixing apparatus for mixing a second liquid with a first liquid the combination which comprises a pump having an inlet and an outlet, means for connecting the inlet of the pump to the source of the first liquid, an eductor having an inlet passage, an aspiration chamber and a substantially cylindrical diffusion passage arranged in series relationship, conduit means for connecting the inlet passage of the eductor to the outlet of the pump, conduit means for connecting the aspiration chamber of the eductor to a source of the second liquid, a mixing chamber having a pair of inlets and an outlet, conduit means for connecting one of the inlets of the mixing chamber to the outlet of the pump, conduit means for connecting the diffusion passage of the eductor to the other inlet of the mixing chamber, the inlet passage of the eductor being constructed to provide a high velocity discharge stream having a velocity substantially in the direction of flow to provide a solid integral discharge stream, the aspiration chamber of the eductor being constructed to permit the boundary of the discharge stream to directly contact the second liquid to permit entrainment of the second liquid, the diffusion passage of the eductor having a larger cross sectional area than the inlet passage and a length at least equal to its diameter for confining the discharge stream from the inlet passage to allow the transfer of energy from the high velocity discharge stream to the second liquid, a restriction disposed in the conduit means connected between the pump and said one inlet of the mixing chamber to cause a portion of the first liquid to be bypassed through the eductor and a restriction disposed downstream from the outlet of the mixing chamber for providing a pressure drop in accordance with the velocity of the liquid flowing through the outlet of the mixing chamber to provide back pressure to liquid flowing through the diffusion passage of the eductor in accordance with the velocity of liquid flowing through the outlet of the mixing chamber.

3. The combination as defined in claim 2 wherein the first and second restrictions form passages disposed in a coaxial arrangement on each side of the mixing chamber so that the flow of the first liquid through the first and second restrictions educts liquid through the other inlet of the mixing chamber.

4. The combination as defined in claim 2 including a pressure regulating means connected between the inlet and the outlet of the pump to maintain the outlet pressure of the pump below a predetermined maximum pressure.

5. The combination as defined in claim 4 including a first valve connected between the outlet of the pump and the inlet of the mixing chamber for controlling the flow of the first liquid therethrough.

6. The combination as defined in claim 5 including a second valve connected between the diffusion passage of the eductor and said other inlet of the mixing chamber to control the flow of liquid through said other inlet of the mixing chamber.

7. In a mixing apparatus for mixing a second liquid with a first liquid from a source of the first liquid under pressure the combination which comprises a first eductor having an inlet passage, an aspiration chamber and a diffusion passage, the diffusion passage of the first eductor being cylindrical and having a length at least equal to its diameter, a second eductor having an inlet passage, a mixing chamber, and a diffusion passage, conduit means for connecting the inlet passages of each of the first and second eductors to the source of the first liquid, conduit means for connecting the aspiration chamber to the second liquid and conduit means for connecting the diffusion passage of the first eductor to the mixing chamber of the second eductor.

8. The combination as defined in claim 7 including a third eductor having an inlet passage, a mixing chamber and a diffusion passage, conduit means for connecting the inlet passage of the third eductor to the source of the first liquid and conduit means for connecting the diffusion passage of the first eductor to the mixing chamber of the third eductor.

9. The combination as defined in claim 7 including first valve means connected in series with the inlet passage of the first eductor for controlling the flow of liquid therethrough and second valve means connected in series with the mixing chamber of the second eductor for controlling the flow of liquid therethrough.

10. A mixing apparatus for mixing a second liquid with a first liquid comprising a pump having an inlet and an outlet, the inlet of the pump being connected to a source of the first liquid, a main conduit having an inlet and an inlet, a bypass conduit having an inlet and an outlet, means connecting the inlet of the main and bypass conduits to the outlet of the pump, a first eductor disposed in the bypass conduit and including an inlet passage, an aspiration chamber and a cylindrical diffusion passage connected in series, the diffusion passage having a larger cross sectional area than the inlet passage and a length at least equal to two times its diameter, conduit means for connecting the aspiration chamber of the first eductor to a source of the second liquid, a second eductor disposed in the main conduit and having an inlet passage, a mixing chamber and a diffusion passage, conduit means for connecting the diffusion passage of the first eductor to the mixing chamber of the second eductor and a nozzle connected to the diffusion passage of the second eductor.

11. The combination as defined in claim 10 wherein the inlet passage of the first eductor is cylindrical and has a length shorter than its diameter.

12. The combination as defined in claim 10 wherein the first eductor is formed by a pair of bushings disposed in the bypass conduit with the space between the bushings defining the aspiration chamber, the second bushing defining a stepped cylindrical passageway therethrough of increasing diameter from inlet to outlet with the first passageway thereof forming the diffusion passage.

13. The combination as defined in claim 10 wherein the first eductor is formed by a pair of bushings disposed in the bypass conduit with the space between the bushings defining the aspiration chamber, and the second bushing defining a stepped passageway of decreasing diameter from inlet to outlet therethrough with the smallest passageway defining the diffusion passageway.

14. The combination as defined in claim 10 including a first valve disposed in the main conduit between the second eductor and the pump for controlling the flow of liquid therethrough and a second valve disposed in the bypass conduit between the first and second eductors for controlling the flow of liquid therethrough.

References Cited in the file of this patent

UNITED STATES PATENTS

| | | |
|---|---|---|
| 1,458,975 | Clauson | June 19, 1923 |
| 2,215,132 | Parker | Sept. 17, 1940 |
| 2,230,201 | Hermann | Jan. 28, 1941 |
| 2,316,781 | Fox | Apr. 20, 1943 |
| 2,599,678 | Walker | June 10, 1952 |
| 2,711,928 | Randa | June 28, 1955 |
| 2,856,234 | McNair et al. | Oct. 14, 1958 |

UNITED STATES PATENT OFFICE
CERTIFICATE OF CORRECTION

Patent No. 3,104,823  September 24, 1963

Stanley A. Hayes

It is hereby certified that error appears in the above numbered patent requiring correction and that the said Letters Patent should read as corrected below.

Column 11, line 35, for "inlet", first occurrence, read -- outlet --.

Signed and sealed this 21st day of April 1964.

(SEAL)
Attest:
ERNEST W. SWIDER

Attesting Officer

EDWARD J. BRENNER

Commissioner of Patents